No. 788,271. PATENTED APR. 25, 1905.
A. F. MADDEN.
STEERING HEAD FOR VEHICLES.
APPLICATION FILED MAY 11, 1904.
2 SHEETS—SHEET 1.
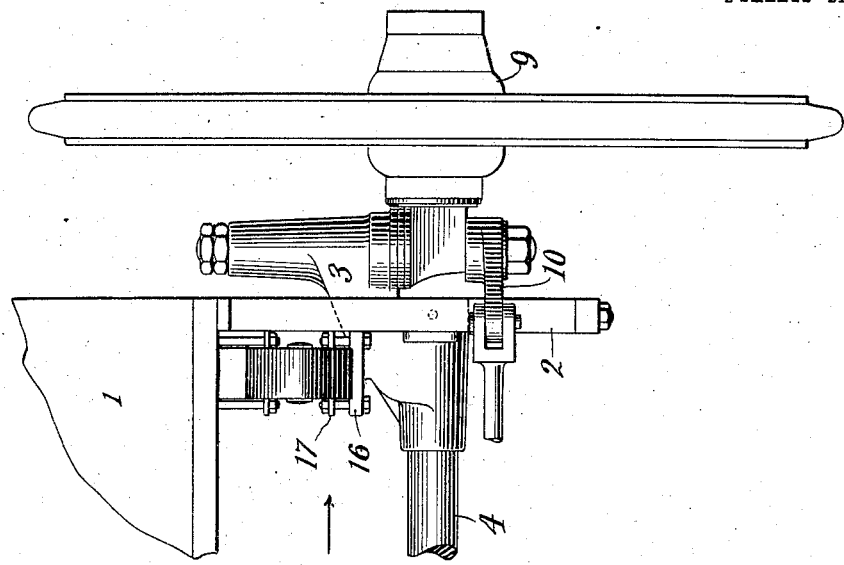
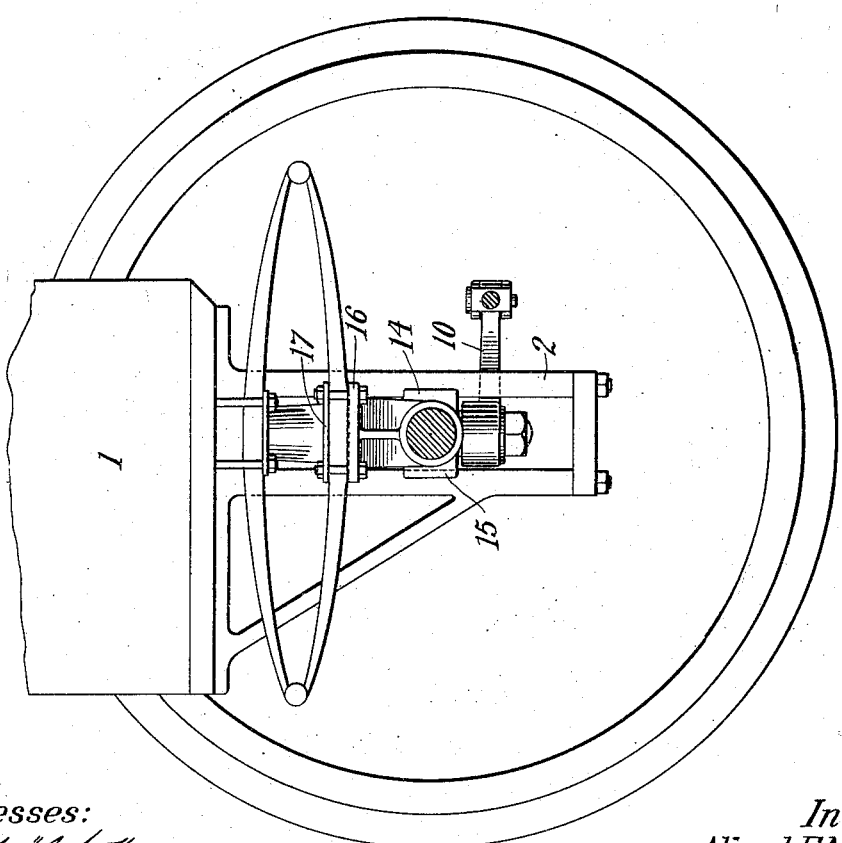
Witnesses:
Inventor
Albert F Madden
by Kerr, Page & Cooper Att'ys.

No. 788,271. PATENTED APR. 25, 1905.
A. F. MADDEN.
STEERING HEAD FOR VEHICLES.
APPLICATION FILED MAY 11, 1904.

2 SHEETS—SHEET 2.

Witnesses:
Raphaël Netter
S. S. Dunham

Inventor
Albert F. Madden
by Kerr, Page & Cooper Attys.

No. 788,271.                                                    Patented April 25, 1905.

UNITED STATES PATENT OFFICE.

ALBERT F. MADDEN, OF NEWARK, NEW JERSEY, ASSIGNOR TO VEHICLE EQUIPMENT COMPANY, OF NEW YORK, N. Y., A CORPORATION OF NEW YORK.

STEERING-HEAD FOR VEHICLES.

SPECIFICATION forming part of Letters Patent No. 788,271, dated April 25, 1905.

Application filed May 11, 1904. Serial No. 207,353.

*To all whom it may concern:*

Be it known that I, ALBERT F. MADDEN, a citizen of the United States, residing at Newark, in the county of Essex and State of New Jersey, have invented certain new and useful Improvements in Steering-Heads for Vehicles, of which the following is a specification, reference being had to the drawings accompanying and forming part of the same.

My invention relates to steering mechanisms of the type in which the axle is immovable horizontally and is provided at its ends with pivoted wheel-spindles which may be turned by suitable devices under the control of the driver or chauffeur.

My object has been to provide a steering mechanism of this general character which shall possess a maximum strength with a minimum weight of material and which shall also be simple in construction and small cost to manufacture.

To these ends the invention consists of the novel features, combinations of elements, and arrangements of parts hereinafter described, and more particularly pointed out in the claim.

The preferred form of the invention is typically illustrated in the accompanying drawings, in which—

Figure 3:
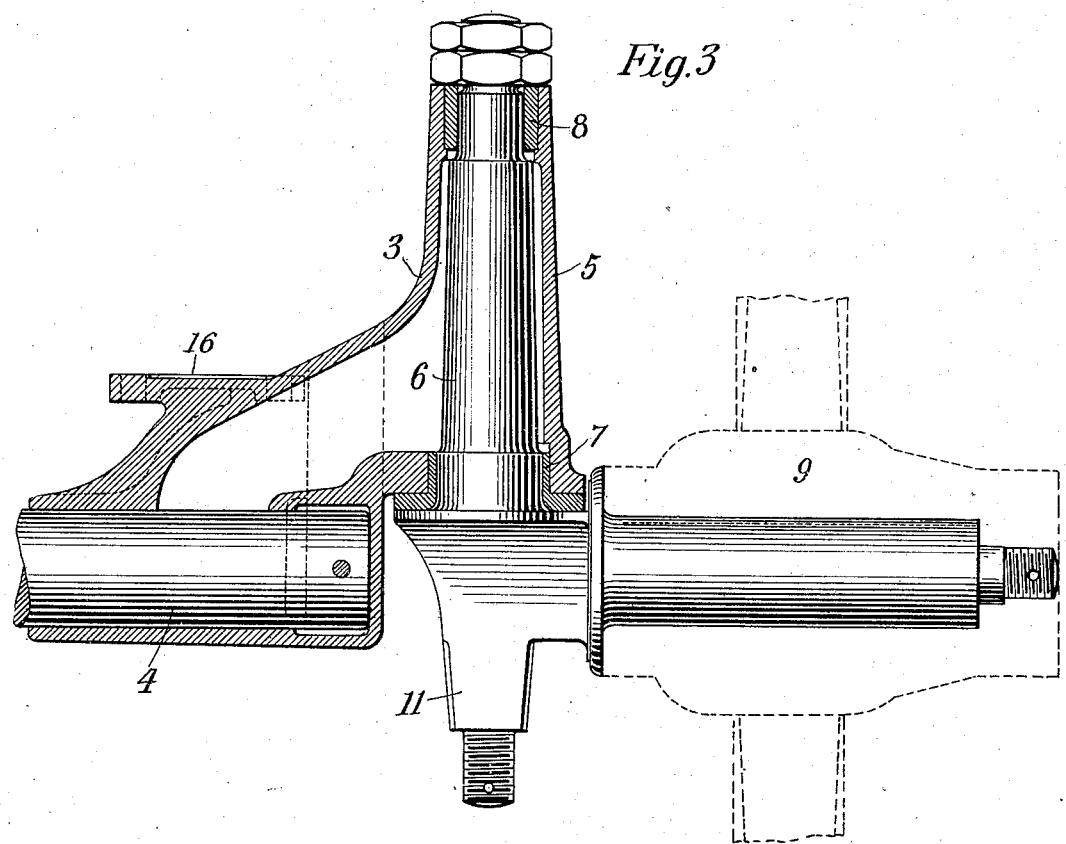
Figure 4:
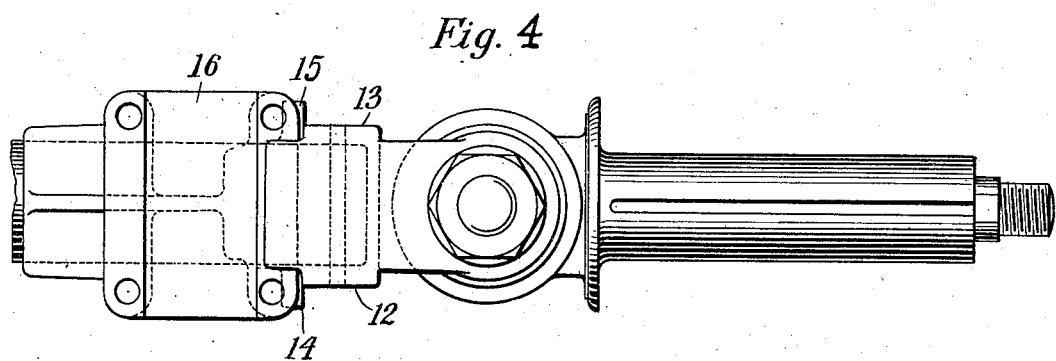

Figure 1 is a front elevation of the steering showing also a suitable connection between the axle and the body of the vehicle. Fig. 2 is a side view of the same looking in the direction of the arrow in Fig. 1. Fig. 3 is a detail view of the head in section, and Fig. 4 is a detail plan view of the same.

The body of the vehicle is indicated by 1. Secured thereto is a pedestal 2, composed of parallel guides or rails between which the axle is free to move vertically.

The steering-head proper consists of a bracket 3, preferably hollow to reduce its weight, having means for attachment to the axle 4—as, for example, the socket shown. At right angles thereto is a pivot-journal 5, into which fits the pivot 6 of the wheel-spindle. Suitable bearings, as 7 8, may be provided for the pivot. In line with the axle and rigidly, preferably integrally, connected to the pivot is the wheel-spindle on which the hub 9 is mounted. It will be noted that the pivotal connection of the wheel-spindle and the bracket is above the former. This is a very strong construction, since it puts all the strength of the bracket above the wheel-spindle, where the strain is greatest. The turning of the spindle on its bracket-pivot is effected in the well-known way by means of a crank 10, secured on a stud 11. On each side of the bracket, preferably closely adjacent to the pivot, I provide bearings 12 13 for the vertical guides of the pedestal, and may also provide flanges, as 14 15, or other suitable devices to engage the sides of the pedestal-rails and prevent displacement of the axle transverse to the vehicle. On the upper side of the bracket is a boss or bearing-plate 16, on which rests the spring 17, secured thereto in any convenient manner, as by means of a bolted plate 17, as shown.

The construction described makes a very strong and simple steering-head and one which is therefore especially adapted for use on large vehicles designed to transport heavy loads; but it is of course of value for lighter vehicles as well.

The form shown I consider the best for most purposes; but it should be understood that the invention may be otherwise embodied without departing from its proper scope.

What I claim is—

A bracket for steering-heads, consisting of a single member having a horizontal socket for securement to the axle, a vertical socket for the vertical pivot of a wheel-spindle, said vertical socket being located entirely above the horizontal socket, a boss or plate above the axle-socket providing a seat for the vehicle-spring, and vertical flanges on the sides of the bracket for engagement with means to prevent sidewise displacement of the bracket and the parts carried thereby, said horizontal and vertical sockets, spring-boss, and flanges, being integral with the body of the bracket, as set forth.

ALBERT F. MADDEN.

Witnesses:
M. LAWSON DYER,
S. S. DUNHAM.